United States Patent
Lu et al.

(10) Patent No.: US 10,652,702 B2
(45) Date of Patent: May 12, 2020

(54) METHODS, USER EQUIPMENT AND APPLICATION MANAGING FUNCTION NODE FOR MANAGING TRANSFER OF MESSAGE OVER RADIO INTERFACE

(71) Applicant: Telefonaktiebolaget LM Ericsson (publ), Stockholm (SE)

(72) Inventors: Qianxi Lu, Beijing (CN); Pontus Wallentin, Linköping (SE); Ivo Sedlacek, Hovorcovice (CZ); Marco Belleschi, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/348,679

(22) PCT Filed: Nov. 10, 2017

(86) PCT No.: PCT/CN2017/110422
§ 371 (c)(1),
(2) Date: May 9, 2019

(87) PCT Pub. No.: WO2018/086582
PCT Pub. Date: May 17, 2018

(65) Prior Publication Data
US 2019/0268732 A1    Aug. 29, 2019

(30) Foreign Application Priority Data
Nov. 11, 2016    (WO) ............... PCT/CN2016/105509

(51) Int. Cl.
*H04W 4/12* (2009.01)
*H04W 4/40* (2018.01)
(Continued)

(52) U.S. Cl.
CPC ............... *H04W 4/12* (2013.01); *H04W 4/40* (2018.02); *H04W 4/70* (2018.02); *H04W 48/02* (2013.01); *H04W 4/90* (2018.02); *H04W 84/045* (2013.01)

(58) Field of Classification Search
CPC ........ H04W 4/12; H04W 4/40; H04W 84/045
See application file for complete search history.

(56) References Cited

U.S. PATENT DOCUMENTS

2015/0195712 A1    7/2015    Pinheiro et al.
2016/0219493 A1*   7/2016    Kim .................... H04W 48/06
(Continued)

FOREIGN PATENT DOCUMENTS

CN    103096495 A       5/2013
WO    2015/147612 A1    10/2015
(Continued)

OTHER PUBLICATIONS

International Search Report and Written Opinion dated Jan. 26, 2018 issued in International Application No. PCT/CN2017/110422. (9 pages).
(Continued)

*Primary Examiner* — Christopher M Brandt
(74) *Attorney, Agent, or Firm* — Rothwell, Figg, Ernst & Manbeck, P.C.

(57) ABSTRACT

A user equipment (110A), an application managing function (130) and methods therein for managing a message transferable over a radio interface of the user equipment (110A) are disclosed. The user equipment (110A) receives (310) a configuration comprising a set of service identifiers mapped to a set of barring categories. Moreover, the user equipment (110A) receives (320) a set of barring parameters mapped to the set of barring categories. The user equipment (110A) also obtains (330) a service identifier associated with the
(Continued)

message. Next, the user equipment (110A) determines (340), based on the configuration, a barring category that is mapped to the service identifier. The user equipment (110A) determines (350) a barring parameter that is mapped to the barring category. Then, the user equipment (110A) manages (360) a transfer of the message over the radio interface according to the barring parameter. Corresponding computer programs and computer program carriers are also disclosed.

20 Claims, 8 Drawing Sheets

(51) Int. Cl.
*H04W 48/02* (2009.01)
*H04W 4/70* (2018.01)
*H04W 84/04* (2009.01)
*H04W 4/90* (2018.01)

(56) References Cited

U.S. PATENT DOCUMENTS

| | | | |
|---|---|---|---|
| 2018/0124679 A1* | 5/2018 | Lee | H04W 48/06 |
| 2018/0234909 A1* | 8/2018 | Chen | H04W 48/06 |
| 2018/0324656 A1* | 11/2018 | Chen | H04W 36/0083 |

FOREIGN PATENT DOCUMENTS

| | | |
|---|---|---|
| WO | 2015/162460 A1 | 10/2015 |
| WO | 2016/006948 A1 | 1/2016 |

OTHER PUBLICATIONS

Nokia Networks, "ACDC impacts on RAN", 3GPP TSG-RAN WG2 Meeting #91, R2-153147, Beijing, China, (Aug. 2015). (5 pages).

Huawei et al., "Access control in NR", 3GPP TSG-RAN WG2 Meeting #96, R2-168256, Reno, Nevada, (Nov. 2016). (4 pages).

Ericsson, "Access Control for NR", 3GPP TSG-RAN WG2 #97, Tdoc R2-1700911, Athens, Greece, (Feb. 2017). (5 pages).

3GPP TS 24.105 V13.1.0 (Mar. 2016); 3rd Generation Partnership Project; Technical Specification Group Core Network and Terminals; Application specific Congestion control for Data Communication (ACDC) Management Object (MO); Release 13, (Mar. 2016). (16 pages).

3GPP TS 24.386 V0.1.1 (Oct. 2016); 3rd Generation Partnership Project; Technical Specification Group Core Network and Terminals; User Equipment (UE) to V2X control function; protocol aspects; Stage 3; Release 14, (Oct. 2016). (11 pages).

IEEE Standards Association, "WAVE and PSID Tutorial", (Nov. 2016). (2 pages).

Extended European Search Report dated Feb. 5, 2020 issued in European Patent Application No. 17868843.8. (9 pages).

\* cited by examiner

METHODS, USER EQUIPMENT AND APPLICATION MANAGING FUNCTION NODE FOR MANAGING TRANSFER OF MESSAGE OVER RADIO INTERFACE

CROSS REFERENCE TO RELATED APPLICATION(S)

This application is a 35 U.S.C. § 371 National Stage of International Patent Application No. PCT/CN2017/110422, filed Nov. 10, 2017, designating the United States and claiming priority to International application no. PCT/CN2016/105509, filed on Nov. 11, 2016. The above identified applications are incorporated by reference.

TECHNICAL FIELD

Embodiments herein relate to wireless communication systems, such as cellular networks. In particular, a method and a user equipment for managing a message transferable over a radio interface of the user equipment as well as a method and an application managing function for facilitating management by the user equipment of the message are disclosed. Corresponding computer programs and computer program carriers are also disclosed.

BACKGROUND

Due to increased interest in using a cellular network, e.g. a Long Term Evolution (LTE) network, for various applications, such as Vehicle-To-Everything (V2X) communication, the Third Generation Partnership Project (3GPP) has defined further functionality that facilitates use of the cellular network for these various applications.

Support for V2X has been defined in 3GPP Release-14 (Rel.14) as extensions to existing Device-To-Device (D2D) specifications. As illustrated in FIG. 1, V2X generally refers to any combination of direct communication between vehicles 112, 114, 115, between a vehicle 112, 114, 115 and a pedestrian 113 with User Equipment (UE) 111, such as a cellular mobile phone and between a vehicle 112, 114, 115 and a network (NW) infrastructure 120, e.g. a base station. V2X communication may take advantage of the NW infrastructure 120, when available, but at least basic V2X connectivity should be possible even in case of lack of coverage by the NW infrastructure 120. Therefore, V2X typically includes a combination of D2D communication and NW infrastructure-based communication. Providing an LTE-based V2X interface may be economically advantageous thanks to potential reuse of existing LTE networks. Moreover, tighter integration between communications with the NW infrastructure (V2I) and Vehicle-To-Pedestrian (V2P) and Vehicle-To-Vehicle (V2V) communications, as compared to using a dedicated V2X technology, may be enabled.

V2X communications may carry both non-safety and safety information, where each of the applications and services may be associated with specific requirements sets, e.g. in terms of latency, reliability, capacity and the like.

In view of the aforementioned D2D communication, also referred to as sidelink operation, sidelink transmission or Proximity-based Services (ProSe, PC), a so called PC5 interface for radio communication have been standardized in 3GPP Rel-12 and onward. In 3GPP Rel-12, two different operation modes have been specified in 3GPP. In a first operation mode (mode-1), a UE in RRC_CONNECTED mode requests D2D resources and a radio base station, or an evolved-NodeB (eNB), grants them via a Physical Downlink Control Channel (PDCCH), while using Downlink Control Information 5 (DCI5) or via dedicated signalling. In a second operation mode (mode-2), a UE autonomously selects resources for transmission from a pool of available resources that the eNB provides in broadcast via System Information Block (SIB) signalling for transmissions on carriers other than a Primary Cell (PCell) or via dedicated signalling for transmission on the PCell. The term PCell is known from a known concept of carrier aggregation, which is not explained here for simplicity. Now, continuing with the operation modes, unlike the first operation mode, the second operation mode can be performed also by UEs in RRC_IDLE.

In Rel.14, D2D communication is extended to include also V2X communication, in order to provide LTE-based D2D communication for V2X services. On the one hand, for design of D2D communication at physical layer in Rel-12, it has been assumed that few UEs compete for the same physical resources in the spectrum, that these UEs carry voice packet for Mission Critical Push-To-Talk (MCPTT) traffic, and that these UEs have low-mobility. On the other hand, V2X communication should be able to cope with higher load scenario, i.e. hundreds of cars could potentially contend physical resources, to carry time/event triggered V2X messages, such as Cooperative Awareness Message (CAM), Decentralized Environmental Notification Message (DENM), and high mobility.

Therefore, 3GPP has discussed possible enhancements to sidelink physical layer, i.e. relating to D2D communication. In particular, in Rel-14 two further operation modes have been introduced: 1) a mode-3 which includes SL SPS and dynamic SL grant similar to mode-1 mentioned above, and 2) a mode-4 which corresponds to UE autonomous resource selection similar to aforementioned mode-2 with some enhancements. These enhancements include a so called sensing procedure in which a UE is required to sense, e.g. listen to, a channel, e.g. one or more resources, for at least a certain time-frame before selecting a resource to be used.

Before proceeding with a description of access control relating to D2D communication, aka sidelink, known access control in LTE will be described.

Access Control in LTE

In case of an overload situation like emergency or congestion, a network may wish to reduce overload by denying access to the cell. Moreover, the network may also need to prioritize between specific users and/or services during overload situations. Access Class Barring (ACB) features have been discussed in 3GPP since Rel-8 in various working groups. Since then, multiple access barring mechanisms have been specified in LTE:

1. ACB as per Rel-8: In this mechanism, it is possible to bar a UE. Normal UEs in Access Class (AC) range 0-9 are barred with a probability factor, also referred to as barring factor and a timer, also referred to as barring duration, whereas specific classes can be controlled separately. Beside the normal classes 0-9, additional classes have been specified to control the access to other type of users, e.g. emergency services, public utilities, security services, etc.

2. Service Specific Access Control (SSAC): The SSAC mechanism allows a network to prohibit Multi-Media Telephony (MMTel)—voice and MMTel-video accesses. The network broadcasts barring parameters (parameters similar to ACB) and an barring algorithm that is similar to ACB (barring factor and random timer). An actual decision if access is allowed is done in the IP Multi-Media Subsystem (IMS) layer of a UE.

3. Access control for Circuit-Switched FallBack (CSFB): The CSFB mechanism allows a network to prohibit CSFB users. A barring algorithm used in this case is similar to ACB.
4. Extended Access Barring (EAB): The EAV mechanism allows a network to prohibit low priority UEs. Barring is based on a bitmap in which each access class (AC 0-9) can be either barred or allowed.
5. Access class barring bypass: The ACB mechanism allows omitting access class barring for IMS voice and video users.
6. Application specific Congestion control for Data Communication (ACDC) barring: ACDC allows barring of traffic from/to certain application. In this solution, applications are categorized based on global application identification (ID) (in Android or iOS). The network broadcasts barring parameters (barring factor and timer) for each category.

Now turning to access control in sidelink, unlike access control in LTE, 3GPP has not yet defined any similar access control framework for the sidelink. Since sidelink operations rely on broadcasting signalling to provide UEs with necessary transmitting/receiving resource pools, a kind of sidelink access control mechanism can in practice be exercised by a network on a cell level by enabling or disabling the broadcasting of transmitting/receiving pools. For example, if sidelink broadcasting signalling, e.g. SIB18 for ProSe communications, SIB19 for ProSe discovery, SIB21 for V2X communications, is not provided, PC5 operations are not allowed in a cell. If sidelink broadcasting signalling is provided, but only a receiving pool is provided, PC5 operations are supported in the cell, but the UE needs to enter RRC_CONNECTED to receive a transmitting pool, e.g. mode-1 or mode-2 as discussed above.

In a context of access control for V2X communication that uses a cellular technology, it may be that for example V2V traffic may use either NW-infrastructure-based communication using LTE-Uu or D2D communication. In case of overload in a cell, a possibility is to use any of the existing mechanisms listed above. However, assuming that the overload may mainly be caused by the V2V communication in this case and recalling that most of the existing access barring mechanisms would also disadvantageously affect other applications than V2X, it may be problematic to use any one of the existing mechanisms.

SUMMARY

An object may be to more accurately and/or efficiently manage transfer of messages over radio interfaces, such as LTE-Uu or PC5, in a cellular network of the above mentioned kind, e.g. an LTE network.

According to an aspect, the object is achieved by a method performed by a user equipment (UE) for managing a message transferable over a radio interface of the UE. The UE receives, from an application managing function, a configuration comprising a set of service identifiers mapped to a set of barring categories. The set of service identifiers is configured to identify at least one service. The UE receives, from a radio access node, a set of barring parameters mapped to the set of barring categories. Each barring parameter is configured to indicate whether or not the radio interface is barred with respect to a respective barring category. The UE obtains a service identifier associated with the message. The UE determines, based on the configuration, a barring category that is mapped to the service identifier. The UE determines a barring parameter that is mapped to the barring category. The UE manages a transfer of the message over the radio interface according to the barring parameter.

According to another aspect, the object is achieved by a method performed by an application managing function, for facilitating management, by a UE, of a message transferable over a radio interface of the UE. The application managing function obtains a set of service identifiers. The set of the service identifiers identifies at least one service. The application managing function sends a configuration comprising the set of service identifiers mapped to a set of barring categories to the UE.

According to a further aspect, the object is achieved by a user equipment (UE) for managing a message transferable over a radio interface of the UE. The UE comprises a processor configured to receive, from an application managing function, a configuration comprising a set of service identifiers mapped to a set of barring categories. The set of service identifiers is configured to identify at least one service. The processor is configured to receive, from a radio access node, a set of barring parameters mapped to the set of barring categories. Each barring parameter is configured to indicate whether or not the radio interface is barred with respect to a respective barring category. The processor is configured to obtain a service identifier associated with the message. The processor is configured to determine, based on the configuration, a barring category that is mapped to the service identifier. The processor is configured to determine a barring parameter that is mapped to the barring category. The processor is configured to manage a transfer of the message over the radio interface according to the barring parameter.

According to yet another aspect, the object is achieved by an application managing function, for facilitating management, by a UE, of a message transferable over a radio interface of the UE. The application managing function comprises a processor configured to obtain a set of service identifiers. The set of the service identifiers identifies at least one service. The processor is configured to send a configuration comprising the set of service identifiers mapped to a set of barring categories to the UE.

According to further aspects, the object is achieved by computer programs and computer program carriers corresponding to the aspects above.

According to further aspects, the object is achieved by computer programs and computer program carriers corresponding to the aspects above.

Thanks to that the application managing function sends a configuration to the user equipment, the user equipment is made aware of how the set of service identifiers are mapped to the set of barring categories. When the user equipment is about to send or receive the message, the user equipment is able to determine, or find, the barring category that is mapped to the service identifier associated with the message. Now that the barring category is determined, the barring parameter that is mapped to the barring category is determined. Subsequently, the user equipment manages the transfer, i.e. the sending or receiving, of the message according to the determined barring parameter, indicating that the message is allowed to be sent or received. In this manner, control of access to the radio interface is performed on a per service basis, while overcoming at least some disadvantages of prior art.

An advantage is hence that the embodiments herein enable management of the message, e.g. access control of the message, wherein the message is identified by the service identifier. Therefore, different messages, associated with different service identifiers, to/from one user application executing in the user equipment may or may not be allowed to be transferred over the radio interface depending on whether the barring parameters of the barring categories mapped to the different services indicate allowed or not allowed.

A further advantage is that the embodiments herein enable steering of traffic, such as the message, between e.g. LTE-Uu and sidelink interfaces, thanks to that e.g. the radio access node may decide to bar a specific barring category on LTE-Uu interface while the same specific barring category is not barred on the sidelink interface, such as PC5.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
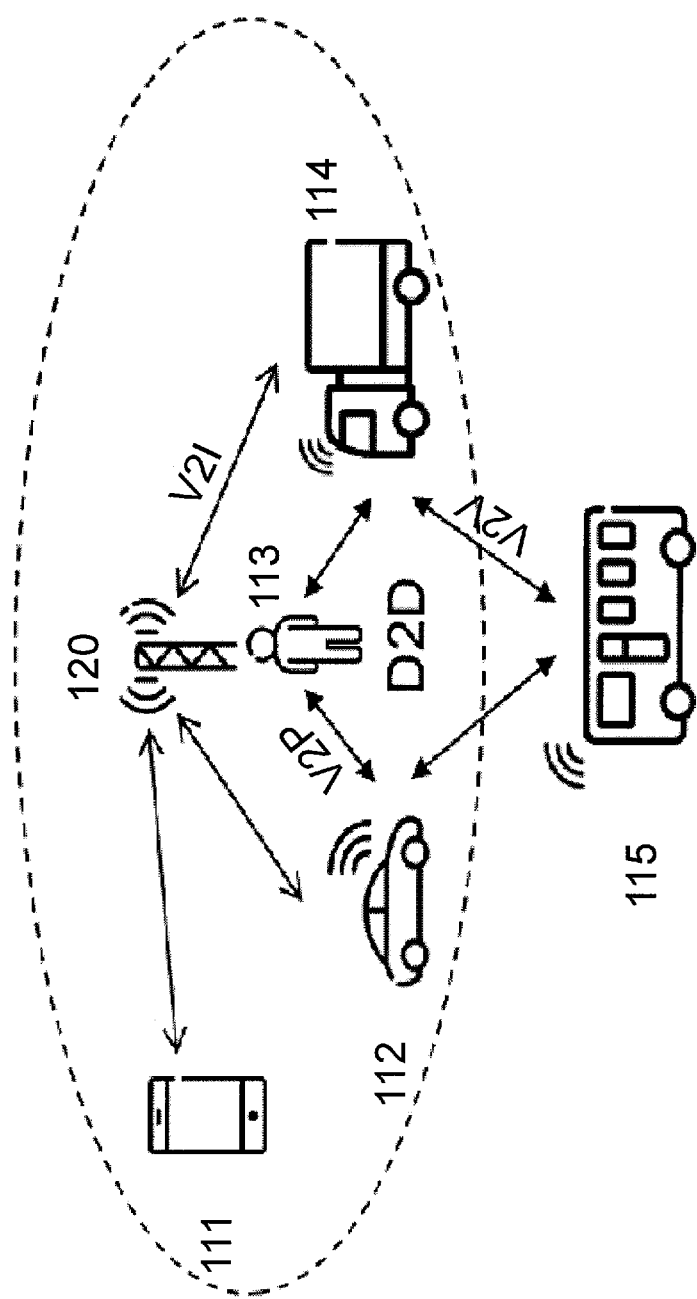
FIG. 1 is a schematic illustration of a scenario relating to embodiments herein.

In order to better appreciate the embodiments herein, the following discussion is provided.

While ACDC, as mentioned in the background section, may be considered for use with V2X, a problem may be that since it is application-specific, it refers to applications by using their "application identifier" (APP ID). Such APP IDs are defined and visible only in the UE's operating system, such as Android, iOS or the like. Here, application refers to application running on an operating system. However, generally in this disclosure, the term "application" shall additionally be understood as an application in terms of a 3GPP application. For the purpose of understanding, it shall here be mentioned that the application is herein mainly represented by a V2X application, but it may be other applications such as a multimedia telephony (MMTel) application, or an IP Multimedia Subsystem (IMS) application. Now proceeding with, the ACDC Management Object (MO) as specified in 3GPP Technical Specification (TS) 24.105. The ACDC MO is used to manage configuration parameters related to ACDC functionality for a UE supporting provisioning of such information: using operating system ID and APP ID as input, and outputs ACDC category. For the applicability to V2X, the following aspects should be considered:

1. Different from traditional applications relying on cellular communication, which operates on an operating system like Android/iOS, there is no clear framework for the V2X application relying on both cellular and D2D communication, in terms of whether there is also an operating system which is assumed to assign APP ID as in legacy system, or the application is directly running on top of modem without an operating system. For the latter case, without APP ID as input to ACDC MO, the legacy ACDC mechanism relying on ACDC category cannot work, and 2. There is V2X service identifier defined for V2X applications in another form, e.g., Provider Service Identifier (PSID) or Intelligent ITS-AIDs of the V2X application, which is not relying on the functionality/existence of operating system to allocate, so it cannot work based on the legacy ACDC MO.

In view of the above, it has been realized that there may be a need for an access control mechanism for particularly suited for V2X traffic, or other application(s). Therefore, the embodiments herein attempt to, in line with the initially mentioned object, address how to enable access control for V2X traffic, considering the different framework of V2X application.

The same problem described for LTE-Uu interface may also affect the sidelink. In current specification, a network can only exercise an implicit sidelink access control, by not providing the necessary sidelink radio resources, i.e. an access control on a per cell basis. In order to provide the same functionality, i.e. access control on a per cell basis, large specification efforts would be required, which at any rate may introduce undesired signalling overhead.

Throughout the following description similar reference numerals have been used to denote similar features, such as nodes, actions, modules, circuits, parts, items, elements, units or the like, when applicable. In the Figures, features that appear in some embodiments are indicated by dashed lines.

Figure 2:
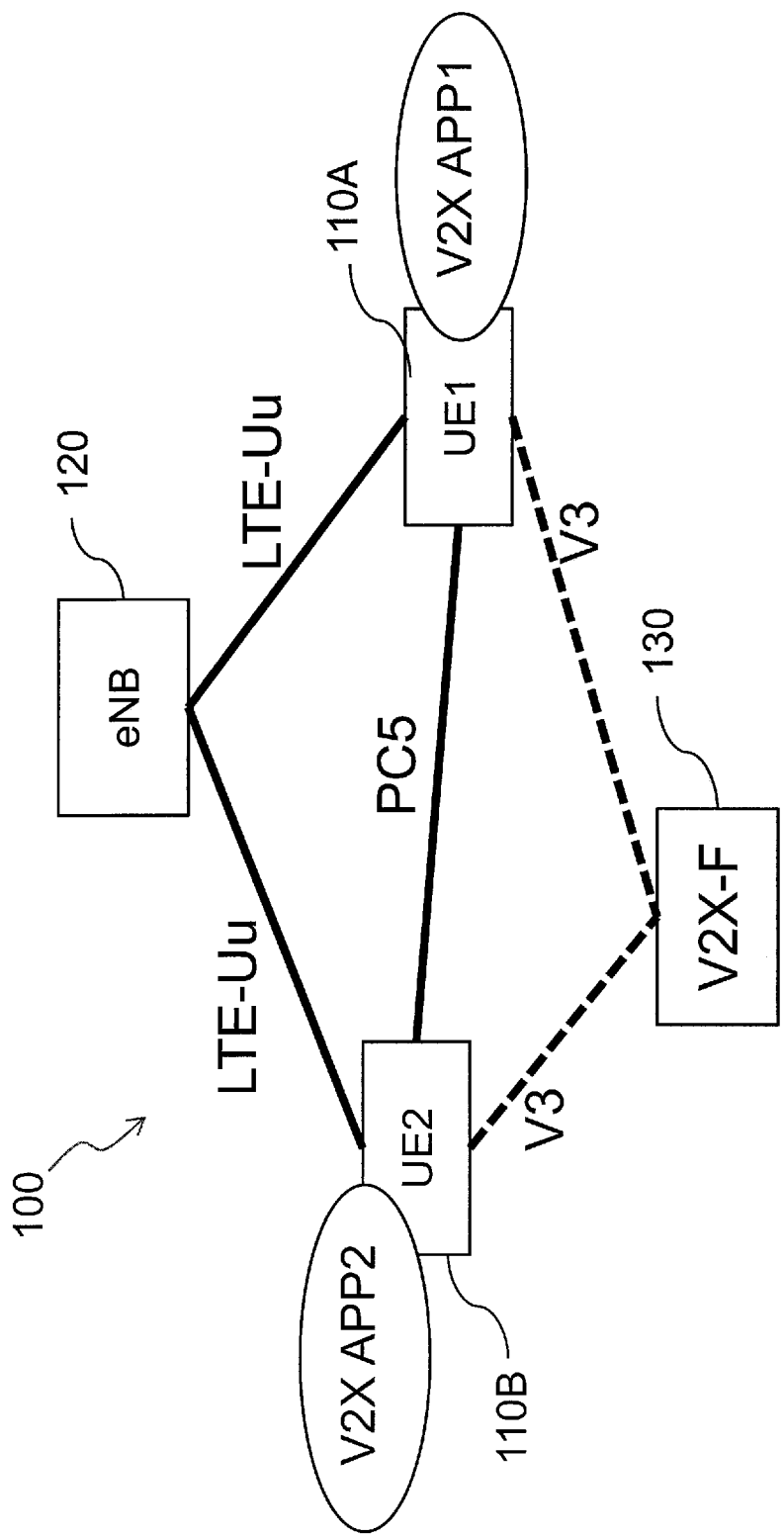
FIG. 2 is a schematic overview of a network in which embodiments herein may be implemented.

FIG. 2 depicts an exemplifying network 100, such as a wireless communication network, a cellular network or the like, in which embodiments herein may be implemented. In this example, the network 100 is an LTE network.

In other examples, the network 100 may be any cellular or wireless communication system, such as a Global System for Mobile communications (GSM), Universal Mobile Telecommunication System (UMTS) and Worldwide Interoperability for Microwave Access (WiMAX) allowing a layer of D2D communications or the like.

The term "wireless communication network" may refer to any type of network that establishes connections without cables. Wireless communications use electromagnetic waves that travel through the air. There are three main categories of wireless communication, based on how far the signal travels. In short-range wireless communication, the signal travels from a few centimeters to several meters. Examples of short-range wireless communication technologies are Bluetooth, Bluetooth Low Energy (Bluetooth LE), 6LowPAN, infrared, near field communication, ultra-band and ZigBee. In medium-range wireless communication, the signal travels up to 100 meters or so. Most widely used medium-range wireless communication technologies include Wi-Fi and Hotspots. In wide-area wireless communication, the signal travels quite far, from several kilometers to several thousand kilometers. Examples of wide-area wireless communication technologies are cellular, WiMAX and satellite. Cellular communication technology includes a LTE, a WCDMA, a GSM, any 3GPP cellular, or any cellular technologies.

The network 100 may be said to comprise a first user equipment "UE1" 110A and a second user equipment "UE2" 110B. For simplicity, the first user equipment 110A may be referred to as user equipment 110A, while being identified as the first user equipment by the reference numeral. This applies also for the second user equipment 110B.

Accordingly, the user equipment 110A and the user equipment 110B are present in the network 100. The user equipment 110A and the user equipment 110B may communicate with each other over a radio interface, such as PC5 known from 3GPP terminologies.

Figure 4:
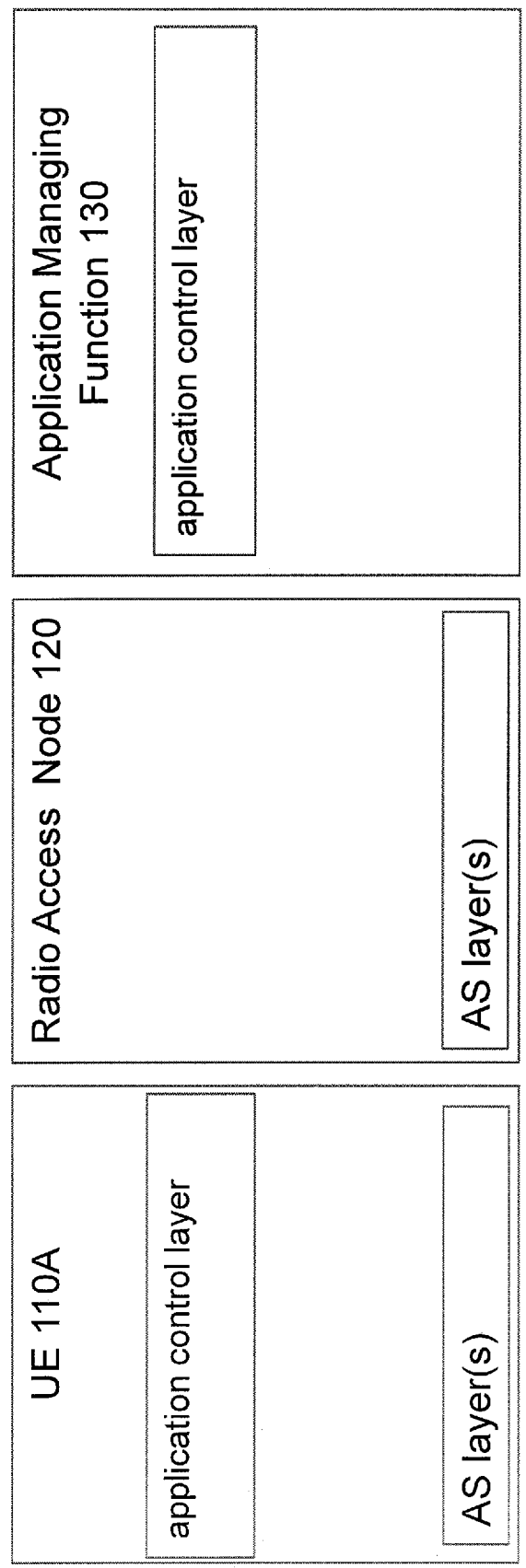
FIGS. 4a through 4c are block diagrams illustrating layers according to embodiments herein.

Moreover, as illustrated in the Figure, each of the user equipment 110A and the user equipment 110B may execute a respective user application, e.g. the V2X applications V2X APP1 and V2X APP2. These user applications may be executing on an operating system of the respective user equipment 110A, 110B. The operating system may be iOS, Android, WindowsPhone or the like. The term "user application" may refer to an application software installed and executable by the user equipment 110A. This may also be referred to as that the user application resides on the user equipment 110A. Accordingly, one may refer to the user application of the user equipment 110A. The user applications thus reside, or execute, in a user application layer. Notably, the terms "user application layer" and "application control layer" are distinguished from each other. Please note that the terms "user application layer" and "application control layer" themselves don't form a limitation to the present disclosure and are used just to differentiate signalling at "user plane" and "control plane". For example, the "user application layer" may also be termed "application layer" and the "application control layer" may also be termed "3GPP application control layer" or "3GPP control layer". Typically, the V2X APP1 is a V2X application in the user application layer. The layers are described in more detail with reference to FIG. 4 below.

The UE 110A, 110B may be an automotive part with wireless communication capability mounted in a vehicle, a wearable device with wireless communication capability, a mobile terminal, or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note that the term UE used in this document also covers other wireless devices such as D2D devices, Machine-To-Machine (M2M) devices, even though they do not have any user. The wearable device may also be referred to as wearable communication device, or electronic wearable portable device. The term "wearable device" refers to electronic technologies or computers that are incorporated into items of clothing and accessories, which can be worn on the body of a user to collect data. Generally, the wearable device has some form of communications capability and will allow a server and the wearer access to collect the data. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, a radio access node 120, such as an eNB, is shown in FIG. 2. The network 100 may comprise the radio access node 120. The radio access node 120 may communicate with the user equipments 110A and 110B over a radio interface, such as LTE-Uu. The radio access node 120 may be said to comprise a radio layer, which may provide the radio interface. This communication may include user transmissions and/or control transmissions. The user transmissions may include user data, payload data, content data etc. The control transmissions may include control information relating to e.g. scheduling, authentication, mobility, power control etc. The user transmissions are only relevant in case the first wireless device is in a cellular mode. The communication may include uplink transmission and/or downlink transmission.

This means that user equipment 110A is capable of using both NW infrastructure-based communication over LTE-Uu, via the radio access node 120, as well as D2D communication towards e.g. user equipment 110B via the PC5 interface, also known as sidelink. The user equipment 110A may for example be an automotive part mounted in a vehicle or a mobile phone carried by a pedestrian.

The radio access node 120 terminates radio channels using LTE-Uu interface and performs functions such as radio resource management and access control in a cell operated by the radio access node 120. It may also control the resources used for LTE-based D2D communication over PC5 in the cell. This means that a radio interface between the user equipment 110A and the radio access node 120 is managed, or controlled, by the radio access node 120 by means of functionality in a so called Access Stratum (AS) layer, such as Packet Data Convergence Protocol (PDCP) and the like.

As used herein, the term "radio access node" may refer to a Base Station System (BSS), a Radio Network Controller (RNC), a Radio Base Station (RBS), a control node controlling one or more Remote Radio Units (RRUs), an access point or the like.

As mentioned for the network 100, the radio access node 120 may use any cellular or wireless communication technology to communicate with the UE 110A, 110B, such as Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G or New Radio (NR) system or any cellular network or system. The radio interface between the radio access node 120 and the UE 110A, 110B is called air interface or Uu interface.

Additionally, FIG. 2 illustrates an application managing function "V2X-F" 130, such as a V2X managing function, a V2X control function, Public Safety control function, MCPTT control function, Public Safety communications/discovery managing function, wearables communications control function, MMTel control function, IMS voice control function, Mobile Broadband control function or the like.

For the sake of simplicity and as example, the following description refers to V2X while it is here explained that the present solution may be applied for other scenarios as well.

It shall here also be said that a network node may include the application managing function 130, also referred to as application layer managing function, application layer control function, application control function, managing function for the application control layer or the like. The term itself does not form a limitation to the present disclosure.

Now returning to user equipment 110A, 110B, the user application V2X APP1 resides in user equipment 110A and uses V2X layer, at least a part of the application control layer, of the user equipment 110A for V2X communication, i.e. V2X messages, such as V2V messages over LTE-Uu towards the radio access node 120 and/or PC5 towards UE 110B. As an example, the V2X APP1 resides in the same vehicle, i.e. same computer, as V2X layer (and layers under V2X layer) of the user equipment 110A or in the same smartphone carried by the pedestrian. V2X messages, sent and received by the V2X APP1, are not interpreted by V2X layer (and layers under V2X layer) of the user equipment 110A. The V2X layer (and layers under V2X layer) of the user equipment 110A and the radio access node 120 see the V2X message as user data.

A further user application V2X APP2, in the similar way as V2X APP1, resides in user equipment 110B and uses V2X layer of user equipment 110B for V2X communication.

The user equipment 110B is capable of using both NW infrastructure-based communication over LTE-Uu, via the radio access node 120, as well as D2D communication using LTE over the PC5 interface, also known as sidelink, with other UEs, such as user equipment 110A. The user equipment 110B may for example be mounted in a vehicle or carried by a pedestrian (in the latter case typically a smartphone). The application managing function 130 may be a logical function used for network related actions required for V2X, such as provisioning the user equipment 110A with configurations in order to use V2X communication, using a V3 interface. The V2X managing function executes in higher layer than access control of the radio access node. The V2X managing function may be located at a server, virtual or physical, in the operator's intranet and/or at any cloud server. The V3 interface is a logical interface realized with a control plane protocol typically on top of the LTE-Uu interface, as e.g. specified in 3GPP TS 24.386.

Figure 3:
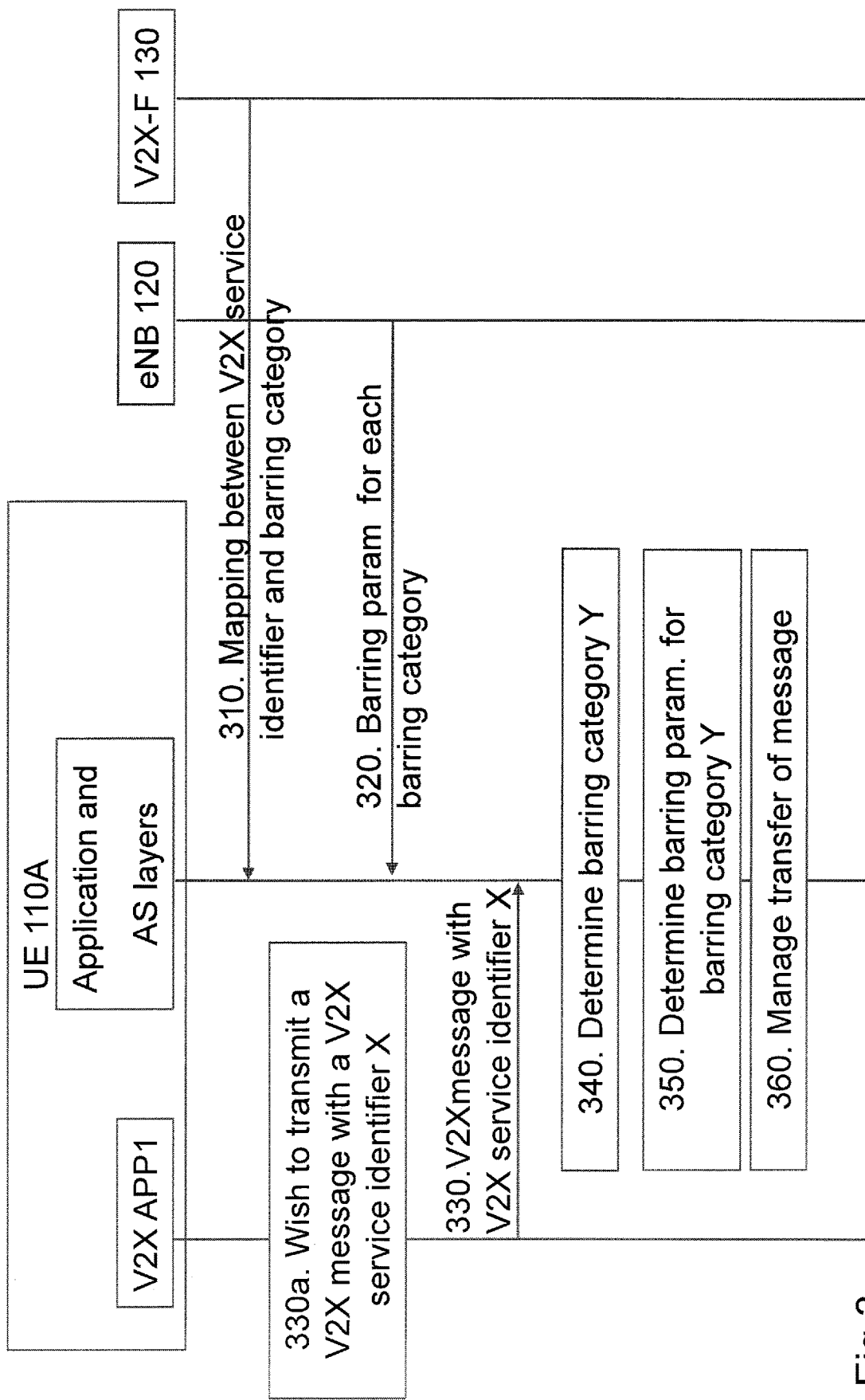
FIG. 3 is a combined signalling and flowchart illustrating methods according to embodiments herein.

FIG. 3 illustrates an exemplifying method according to embodiments herein when implemented in the network 100 of FIG. 2.

One or more of the following actions may be performed in any suitable order.

Initially, it may be that an operator may wish to provide an application, such as a V2X application, a Public Safety application or the like, via its network, such as the network 100, which is compatible with 3GPP specifications.

Thanks to that the operator operates, or manages, the application as well as the network, the operator may decide that its application, herein after exemplified by a V2X application, may provide one or more services. Each service of these one or more services is identified by a respective service identifier. The service identifier may be a number, a string or the like. Taking V2X service identifiers as an example, a service identifier of a V2X service is e.g. PSID or ITS-AIDs of the V2X application.

The operator's network 100 may provide in its so called Access Stratum layers access control based on a set of barring categories. Accordingly, the operator has requisite knowledge to provide a configuration that maps the set of service identifiers to the set of barring categories as appropriate. For example, a first service of the V2X application that may be less critical may be mapped to a first barring category that is among the least prioritized barring categories, i.e. the first barring category may be blocked first, or almost first, in case of overload at the radio access node 120. Similarly, a second service of the V2X application, which may be crucial and very critical, may be mapped to a second barring category that is among the most prioritized barring categories, i.e. the second barring category may be blocked last, or almost last, in case of overload at the radio access node.

This means that all messages of the V2X application may be associated with a service, which is identified by a service identifier (ID). In order to determine whether or not a transfer, i.e. reception or transmission with respect to the UE 110A, of the message is barred over the radio interface, the UE 110A may need to know a correspondence between the service identifier and a barring categories. As explained above, the operator is capable of providing the configuration for mapping of the set of service identifiers to the set of barring categories.

Action 310

Therefore, the UE 110A may receive, from e.g., an application managing function 130, the configuration, which comprises the set of service identifiers mapped to the set of barring categories. The configuration may be considered to be a mapping from service identifier(s) to barring category (ies).

The set of service identifiers identifies at least one service, e.g. one or more services provided by the V2X application. The service may be accessible by a user application of the UE 110A, such as the above mentioned V2X APP1.

This means that the application managing function 130 may configure the UE 110A with a mapping of V2X service identifier(s), such as PSIDs or ITS-AIDs, to a Barring category(s). As an example, V2X service identifier X is mapped to a barring category Y, V2X service identifiers A, B and C are mapped to a barring category D, or the like.

According to some embodiments, the receiving Action 310 is performed via an interface between the UE 110A, 110B and the application managing function 130, e.g. a V3 interface. This interface may generally be referred to as an application control layer interface, which is different from the aforementioned radio interface. This means that the receiving 310 of the configuration is performed, e.g. terminated, in the application control layer of the user equipment 110A. Normally, the configuration is sent via the radio access node, but then the radio access node 120 sees the configuration as generic data that the radio access node 120 cannot interpret.

As an example, the configuration may be realized as a table shown below.

TABLE 1

| Example of the configuration | |
|---|---|
| Service identifier | Barring category |
| 123 | 1 |
| 124 | 2 |
| 125 | 3 |
| 126 | 4 |

The configuration illustrated above in the table is exemplifying. The table may comprise other values than those indicated. The set of service identifiers may also include one or more values, such as any suitable integer. In other examples, the table above may include fewer or greater number of rows than as shown.

Action 320

Regularly, irregularly or upon triggering of an event, such as an overload at the radio interface between the radio access node, an overload within the radio access node or the like, the radio access node 120 may wish to control, or manage, access to the network 100 by denying or granting permission for messages to be sent of the radio interface. This is performed by that the radio access node 120 sends a set of barring parameters that are mapped to the set of barring categories. Each barring parameter indicates whether or not the radio interface is barred with respect to a respective barring category of the set of barring categories.

Accordingly, the user equipment 110A may receive the set of barring parameters mapped to the set of barring categories, from e.g., the radio access node 120 or a further UE 110B. The set of barring parameters and their relation to the set of barring categories may be referred to as a mapping, an access control command or the like. In view of the above, it deserves to be noted that the mapping, or the access control command, may be sent from e.g. the user equipment 110B. In this case, the mapping may be received over the PC5 interface.

Expressed differently, the radio access node 120 provides, e.g. sends, a barring parameter, e.g., barring status (barred/unbarred) for each barring category in a certain range. The radio access node 120 may also provide a barring parameter, e.g., barring factor (percentage), and/or barring durations for each barring category in a certain range. Typically, the barring parameters are provided in so called System Information Block (SIB) to the UE 110A. According to some embodiments, the barring parameter comprises a barring value, also referred to as barring factor. A barring status may be either zero or one for each barring category. For instance, when the barring status is "1" the radio interface is barred and when the barring status is zero "0" the radio interface is not barred.

The receiving 320 of the set of barring parameters mapped to the set of barring categories may be performed, e.g. terminated, at the radio layer of the UE 110A.

As an example, the mapping, or the access control command, may be realized by a table as shown below.

TABLE 2

Example of the mapping in action 320

| Barring category | Barring factor | |
|---|---|---|
| | Uu interface | PC5 interface |
| 1 | 1 (barred) | 0 (not barred) |
| 2 | 0.5 | 0.8 |
| 3 | 0.2 | 0.4 |
| 4 | 1 | 1 |

The column of the barring factor may include any one of or both of the columns illustrated above. The barring category may be specific for different radio interfaces, i.e. Uu/PC5. For example, the same V2X service ID can be mapped to two different barring factors of the same barring category, one to control Uu access, the other to control PC5 access. In case PC5 is used, two additional barring categories may be specified, one to indicate whether UE-autonomous resource selection is allowed, e.g. mode-2, mode-4 as mentioned in the background section, one to indicate that network scheduled resource selection is allowed, e.g. mode-1, mode-3 as mentioned in the background section. Moreover, the barring factor may include a column relating to establishment of PDN connection as indicated herein.

The mapping illustrated above in the table is exemplifying. The table may comprise other values than those indicated. In other examples, the table above may include fewer or greater number of rows than as shown.

According to some embodiments, said each of said barring parameters may comprise a barring value, "1" or "0" or any value between 0 and 1, indicating whether or not the radio interface is barred for the respective barring category.

In conventional access control, the barring value may be referred to as a barring factor. Hence, said each of said barring parameters may further comprise at least one of: a barring factor and a barring duration, which may be specified for each Public Land Mobile Network (PLMN) and each barring category.

In some embodiments, the ACDC categories may be reused in action 310, in which case the ACDC signalling in the SIB may be reused as well.

The person skilled in the art will appreciate that the above Actions 310 and 320 may be performed in any order. After Actions 310 and 320, it is possible to map a service ID to a barring parameter. Thereby it is made possible to manage a message with a service ID according to its barring parameter as below.

Action 330a

The user application V2X APP1, being executed by the UE 110A, may wish to send a message with a service identifier, or to receive a message with the service identifier from another user application V2X APP2 being executed by UE 110B. For instance, a V2X application wishes to transmit a message of a V2X service with a V2X service identifier X.

Possible implementation forms include that the service identifier is carried in the message of the service, and/or the service identifier is sent in a separate message from the message of the service.

Before transferring the message, the UE 110A may perform a barring check and then manage the message according to the barring check, which will be explained in detail in Actions 330-360 below.

Action 330

When the message is about to be received or sent, the application control layer of the UE 110A may obtain the service identifier associated with the message. The message may comprise the service identifier.

As explained above, the configuration may be provided to the application control layer of the UE 110A. Therefore, the message and its associated service identifier may need to be processed in the application control layer in order to use the configuration as in action 340 below.

As a specific example relating to V2X, the V2X APP1 provides a V2X message together with a V2X service identifier to the V2X layer of the UE 110A.

Action 340

Accordingly, the UE 110A may determine, based on the configuration, the barring category that is mapped to the service identifier. As an example, the UE 110A may determine the barring category by using the service identifier as an index to find its barring category in the configuration, received in action 310.

Expressed differently, the V2X layer of the UE 110A may, based on the V2X service identifier X, determine the Barring category Y according to the configuration obtained in action 310 and may pass the V2X message and the determined Barring category Y to the lower layers, such as the AS layers, of the UE 110A.

Action 350

The UE 110A, 110B may determine a barring parameter that is mapped to the barring category. In other words, the UE 110A, 110B may determine the barring parameter by using the barring category as an index to find its corresponding barring parameter in the mapping, or the access control command, received in action 320.

According to some embodiments, the determining Action 350 of the barring parameter is performed in the radio layer of the UE 110A, e.g. the AS layer.

This means that the AS layer in the UE 110A checks whether Barring category Y is barred by determining the barring parameter. The barring parameter then indicates, implicitly or explicitly, whether the message should be barred or not barred, i.e. if it is allowed to be transmitted/received or not allowed to be transmitted/received. By implicit indication, it may mean that the barring parameter alone is not enough to determine whether or not access is allowed or not. In order to determine whether access is allowed or not an exemplifying barring check as below may be used or another similar check may be used. By explicit indication, it may mean that the barring parameter alone determines whether access is allowed or not.

As an example of the barring parameter determination in this action, 3GPP TS 36.331, section 5.3.3.13 reads:

| 5.3.3.13 Access barring check for ACDC |
|---|
| The UE shall:<br>1> if timer T302 is running:<br>  2> consider access to the cell as barred;<br>1> else if SystemInformationBlockType2 includes "ACDC barring parameter":<br>  2> draw a random number 'rand' uniformly distributed in the range:<br>    0 ≤ rand < 1;<br>  2> if 'rand' is lower than the value indicated by ac-BarringFactor included in "ACDC barring parameter":<br>    3> consider access to the cell as not barred;<br>  2> else:<br>    3> consider access to the cell as barred;<br>1> else:<br>  2> consider access to the cell as not barred;<br>1> if access to the cell is barred and timer T302 is not running:<br>  2> draw a random number 'rand' that is uniformly distributed in the range 0 ≤ rand < 1;<br>  2> start timer "Tbarring" with the timer value calculated as follows, using the ac-BarringTime included in "ACDC barring parameter": "Tbarring" = (0.7+ 0.6 · rand) · ac-BarringTime. |

Hence, if e.g. the barring parameter has a value of 0.5, a result of the above described barring check/determination may be either barred or not barred depending on a random value.

Furthermore, this action may take into account any barring category(ies) stored on a so called Subscriber Identity Module (SIM), Universal SIM (USIM) or the like.

Action 360

After determining 350 the barring parameter, the UE 110A may manage a transfer of the message over the radio interface according to the barring parameter. The transfer of the message relates to at least one of: a transmission, by the UE 110A, 110B, of the message, a reception, at the UE 110A, 110B, of the message, and an establishment a Packet Data Network, PDN, connection over which the message may be transferred.

For instance, in case the barring parameter is "1", the UE 110A, 110B may manage the transfer of the message by barring the transfer of the message in a certain time period according to a barring duration.

Again, this action may be performed in the radio layer of the UE 110A.

The final actions above, such as actions 330 to 360, when put in the context of V2X, may be described as that when the user application layer in the UE 110A wishes to send a V2X message of a V2X service with a V2X service identifier X, the user application layer in the UE passes the V2X message and the V2X service identifier to the V2X layer (application control layer) in the UE. The V2X message may then be an example of the message above. The V2X layer in the UE 110A maps the V2X service identifier X to Barring category Y, and then the UE checks whether Barring category Y is barred. It is only when Barring category Y is not barred that the UE may access the network to send or receive the V2X message.

In action 360, as an example, the AS layer of the UE 110A uses the barring parameter to decide e.g. whether or not to transmit the V2X message. For example, if the barring check as above provides a result that indicates "barred", the UE 110A does not transmit the message on LTE-Uu. For example, if the result indicates "not barred", the UE 110A transmits the message on LTE-Uu.

The result of the barring check may also be used by the V2X application and/or the V2X layer in the UE 110A to decide whether or not to transmit the V2X message on the LTE-Uu interface or on the PC5 interface. As an example, in case the result is "barred" for the LTE-Uu interface, the message is instead sent on PC5. In this case, it may be enough with only one column for the barring factor.

As indicated by Table 2 above, the message, such as V2X message, when sent using V2X communication over PC5, may be subject to managing according to the embodiments herein. This means that the radio interface may be PC5 interface according to LTE.

As described in action 320 above, the barring categories, mapped to different V2X service ID, may also be PC5-specific. In case PC5 is used, two additional ACDC categories can be specified, one to indicate whether UE-autonomous resource selection is allowed (e.g. mode-2, mode-4), one to indicate that network scheduled resource selection is allowed (e.g. mode-1, mode-3).

In view of action 320, SIB broadcasting may also or alternatively contain information on whether a certain barring category is available for reception (in which case a reception pool is provided) and/or for transmission.

In case of transmission, the transmitting pool can be left empty to indicate that sidelink resources can be acquired upon entering RRC connected, or alternatively the transmitting pool is absent to indicate that sidelink transmitting resources are not provided in the cell for a certain application.

In view of action 350 and 360 above, the AS layer, e.g. RRC or a new AS layer above PDCP, checks whether the barring category Y is barred, while recalling the example in action 360 discussing barring category Y. Since the Barring category Y may be either related to the PC5 interface or to the Uu interface, the AS layer is also in charge to re-route the V2X message over different protocol stacks, i.e. the Uu protocol stack or the PC5 protocol stack, depending on whether the PC5 or the Uu is barred.

In another embodiment, the AS layers together with higher layers, such as the application control layer and/or the user application layer, may perform the actions above to enable or disable UE sidelink reception via PC5 interface, irrespective of whether there are packets to transmit or not. For example, the user application layer and/or the application control layer may signal to the AS layer, or similar layer, a specific V2X service ID to indicate reception. The AS layer may then check whether the corresponding barring category is barred or not barred and report barred or not barred back to the user application layer and/or the application control layer.

The embodiments herein advantageously provides a framework for managing messages over the radio interface, e.g. for controlling access for cellular traffic, such as V2X traffic, both on Uu and the PC5 interface (sidelink).

Moreover, the embodiments herein enable control or management of access for specific user applications or services used by the user applications, where messages of the user applications are identified by Service Identifiers, such as V2X-specific service identifiers, such as PSID and ITS-AID, without affecting other applications, including other V2X applications.

As explained above, the embodiments herein may be used to steer traffic, including the messages discussed above, caused by a UE. The traffic and/or message may relate to V2X and/or V2V communication over the LTE-Uu interface and/or over PC5 interface, i.e. D2D or sidelink. This kind of traffic steering is often referred to as path selection.

In comparison with conventional ACDC, in which the application ID is visible only in the UE's operating system and as a given application may use different services, the traffic of an individual service cannot be controlled, steered, admitted or denied, by the network. The embodiments herein enable the network to send the mapping between service IDs and barring categories. Thereby network can control the traffic of an individual service, rather than of an application.

The conventional V2X managing function, only configures a list of authorised V2X service identifiers identifying authorized V2X services. The V2X managing function according to the embodiments herein configures a mapping of a set of service identifier and a set of barring categories. The service identifier is configured to identify a service provided by a user application of the UE.

FIG. 4a to FIG. 4c illustrate in more detail an example relating to the layers used with the embodiments herein. Generally, a layer may be viewed upon as a specification, or an agreement, of how software components, or software modules, may interact with each other. Therefore, when it is described as that something is performed in by the layer, it may mean that the software component acts as agreed according to e.g. the agreement. This is also a reason to that it can be shown as that the same layer exists in two very different entities, such as the UE 110A and the radio access node 120. Clearly, it is normally not the exact same software component that is executed in these two entities. Rather, it is two different software components that use the same agreement or specification, whereby communication and understanding between the entities is possible.

FIG. 4a illustrates that the UE 110A may comprise, such as execute, provide, store or the like, a user application layer (not shown), an application control layer, and an Access Stratum layer (other layers are not shown for simplicity). The application control layer may be exemplified by the PC3 control layer in some embodiments.

FIG. 4b illustrates that the radio access node may comprise, such as execute, provide, store or the like, an Access Stratum layer (other layers are not shown for simplicity).

FIG. 4c illustrates that the application managing function 130 may comprise, such as execute, provide, store or the like, an application control layer (other layers are not shown for simplicity).

The AS layer(s) refers to Access Stratum Layer(s), e.g. MAC etc., being part of 3GPP. The application control layer may comprise the V2X layer.

Example of embodiments of a method performed by a user equipment (UE), 110A, 110B, for managing a message transferable over a radio interface of the UE 110A, 110B, will now be described with reference to FIG. 3 and FIG. 5. The radio interface may comprise at least one of: a Uu interface between the UE 110A, 1108 and the radio access node 120, and a PC5 interface between the UE 110A and a further UE 110B. For simplicity, the same reference numerals have been used for the same or similar action in both FIG. 3 and FIG. 5.

One or more of the following actions may be performed in any suitable order.

Action 310

The message is of a service, which is identified by a service identifier (ID). In order to determine whether or not a transfer of the message is barred over the radio interface, the UE 110A, 110B may need to know a correspondence between the service identifier and a barring categories.

The UE 110A, 1108 may receive, from e.g., an application managing function 130, a configuration comprising a set of service identifiers mapped to a set of barring categories.

The set of service identifiers identifies at least one service. The service is accessible by a user application of the UE 110A, 1108. According to some embodiments, said at least one service is related to at least one of: Vehicle-to-everything (V2X), Public Safety communication, Public Safety discovery, wearable communication, multimedia telephony (MMTel), IP Multimedia Subsystem (IMS), and Mobile Broadband.

The configuration herein may refer to a correspondence, or mapping between the set of service identifiers and the set of barring categories. The configuration may be received from any function working at 3GPP control layer, e.g., an application managing function 130, which will be discussed in more details below.

According to some embodiments, the receiving Action 310 is via an interface between the UE 110A, 110B and the application managing function 130, e.g. V3 interface of the application control layer.

According to some embodiments, the UE 110A, 110B may comprise a user application layer, an application control layer and a radio layer.

According to some embodiments, the receiving Action 310 of the configuration is performed in the application control layer of the UE 110A, 110B.

Action 320

In order to link the barring category to a barring parameter, the UE 110A, 110B may need to acknowledge a mapping between a barring category and a barring parameter.

The UE 110A, 110B may receive a set of barring parameters mapped to the set of barring categories, from e.g., a radio access node 120 or a further UE 110A, 110B. According to some embodiments, the radio access node 120 comprises a radio layer. The sending of the set of barring parameters mapped to the set of barring categories may be performed at the radio layer of the radio access node 120 or the further UE 110A, 110B.

A barring parameter, is barring category specific, and may be set per barring category. According to some embodiments, said each barring parameter indicates whether or not the radio interface is barred with respect to a respective barring category.

According to some embodiments, said each of said barring parameters may comprise a barring value, "1" or "0", indicating whether or not the radio interface is barred for the respective barring category. According to some embodiments, said each of said barring parameters may further comprise at least one of: a barring factor and a barring duration.

According to some embodiments, the receiving Action 320 of the set of barring parameters is performed in the radio layer of the UE 110A, 110B.

The person skilled in the art will appreciate that the above Actions 310 and 320 may be performed in any order. The Actions 310 and 320 are configuration actions, which may be performed only once at the very beginning, or be performed when the related configurations need to be updated. After Actions 310 and 320, a service ID is enabled to be mapped to a barring parameter. Thereby it is enabled to manage a message with a service ID according to its barring parameter as below.

Action 330*a*

The user application being executed by the current UE 110A, 110B may wish to send a message with a service identifier, or to receive a message with a service identifier from another user application being executed by another UE 110A, 110B. For instance, a V2X application wishes to transmit a message of a V2X service with a V2X service identifier X.

Possible implementation forms include the service identifier is carried in the message of the service, and/or the service identifier is sent in a separate message from the message of the service.

Before transferring the message, the UE 110A, 110B will do barring check and then manage the message according to the barring check, which will be explained in detail in Actions 330-360 below.

Action 330

The UE 110A, 110B may obtain a service identifier associated with the message.

According to some embodiments, the obtaining Action 330 of the service identifier is performed in the application control layer of the UE 110A, 110B.

Action 340

The UE 110A, 110B may determine, based on the configuration, the barring category that is mapped to the service identifier. In other words, the UE 110A, 110B may determine the barring category by using the service identifier as an index to find its barring category in the mapping, received at Action 310.

According to some embodiments, the determining Action 340 of the barring category is performed in the application control layer of the UE 110A, 110B.

Action 350

The UE 110A, 110B may determine a barring parameter that is mapped to the barring category. In other words, the UE 110A, 110B may determine the barring parameter by using the barring category as an index to find its corresponding barring parameter in the mapping, received at Action 320.

According to some embodiments, the determining Action 350 of the barring parameter is performed in the radio layer of the UE 110A, 110B.

Action 360

After having the barring parameter, the UE 110A, 110B may manage a transfer of the message over the radio interface according to the barring parameter.

For instance, in case the barring parameter is "0", the UE 110A, 110B may manage the transfer of the message by barring the transfer of the message in certain time period according to the barring duration.

According to some embodiments, the transfer of the message relates to at least one of:

sending, by the UE 110A, 110B, of the message,
receiving, by the UE 110A, 110B, of the message, and
establishing a Packet Data Network, PDN, connection for the message.

According to some embodiments, the managing 360 of the transfer of the message is performed in the radio layer of the UE 110A, 110B.

Figure 5:
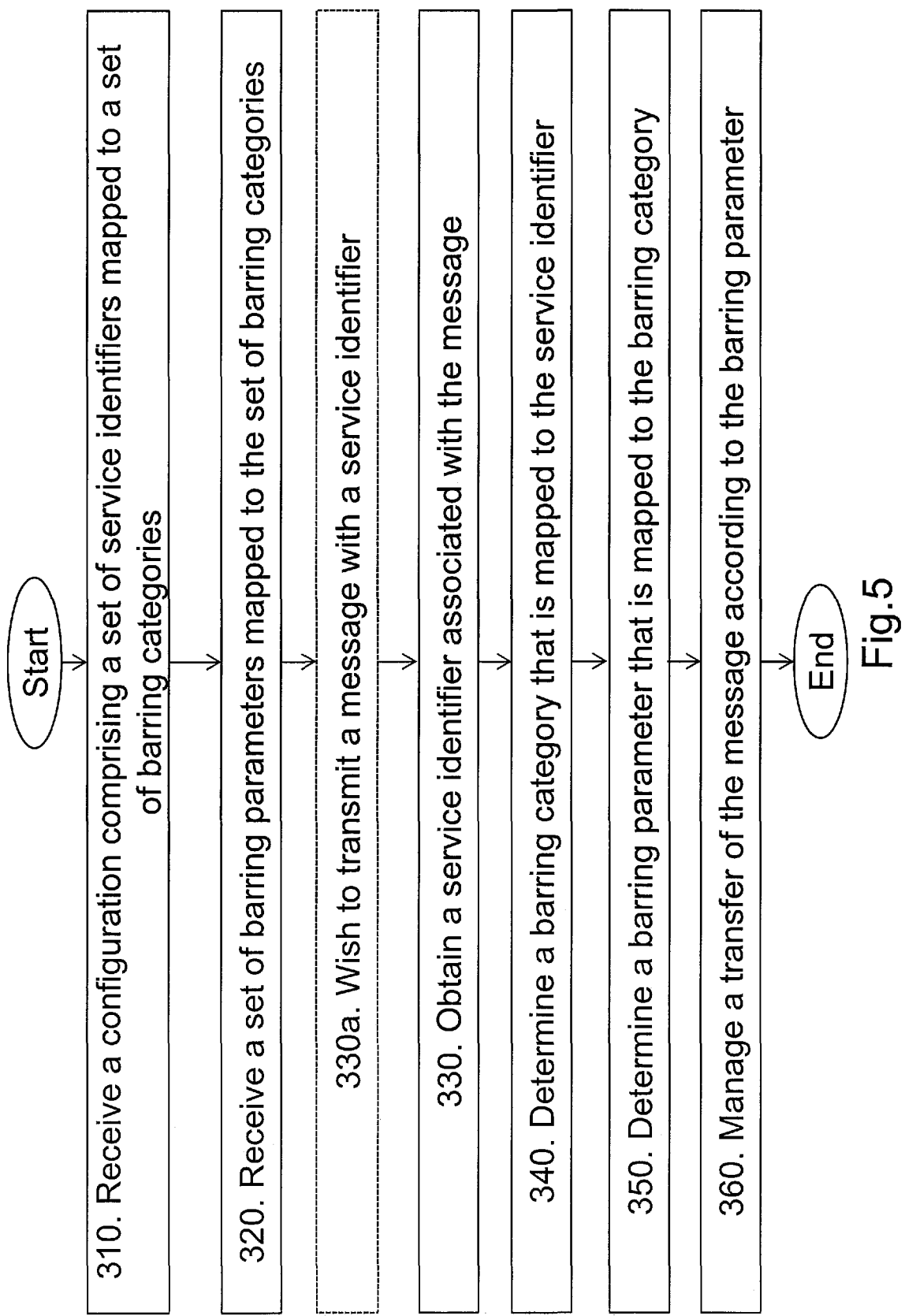
FIG. 5 is a flowchart illustrating embodiments of the method in the user equipment.

To perform the method embodiments corresponding to FIG. 3 and FIG. 5, the UE 110A, 110B shown in FIGS. 1-3 is discussed herein. The UE 110A, 110B may comprise the following arrangement depicted in FIG. 6 for managing a message transferable over a radio interface of the UE 110A, 110B. The UE 110A, 110B may be configured to comprise a user application layer, an application control layer and a radio layer.

In some embodiments, the UE 110A, 110B may comprise a processing module, or a processor 601, such as a means for performing the methods described herein. The means may be embodied in the form of one or more hardware modules and/or one or more software modules.

The UE 110A, 110B may further comprise a memory 602. The memory may comprise, such as contain or store, instructions, e.g. in the form of a computer program 603, which may comprise computer readable code units.

According to some embodiments herein, the UE 110A, 110B and/or the processing module 601 may comprise a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the UE 110A, 110B is operative to perform the methods of FIG. 3 and FIG. 5. As another example, the instructions, when executed by the UE 110A, 110B and/or the processing circuit 604, may cause the UE 110A, 110B to perform the method according to FIG. 3 and FIG. 5.

According to some embodiments, the UE 110A, 110B is configured, e.g. by means of a first receiving module 610, to receive, from the application managing function 130, the configuration comprising a set of the service identifiers mapped to a set of the barring categories. In an implementation form, the receiving of the configuration is performed in the e.g., in the application control layer of the UE 110A, 110B, According to some embodiments, the UE 110A, 110B is further configured, e.g. by means of a second receiving module 620, to receive, from the radio access node 120, a set of the barring parameters mapped to the set of barring categories. In an implementation form, the receiving of the set of barring parameters is performed in the radio layer of the UE 110A, 110B.

According to some embodiments, the UE 110A, 110B is further configured, e.g. by means of an user application 670, to request to send the message with the service identifier According to some embodiments, the UE 110A, 110B is further configured, e.g. by means of an obtaining module 630, to obtain the service identifier associated with the message. In an implementation form, the obtaining of the service identifier is performed in the application control layer of the UE 110A, 110B.

According to some embodiments, the UE 110A, 110B is further configured, e.g. by means of a first determining module 640, to determine, based on the configuration, the barring category that is mapped to the service identifier. In an implementation form, the determining of the barring category is performed in the application control layer of the UE 110A, 1108.

According to some embodiments, the UE 110A, 110B is further configured, e.g. by means of a second determining module 650, to determine the barring parameter that is mapped to the barring category. In an implementation form, the determining of the barring parameter is performed in the radio layer of the UE 110A, 110B.

According to some embodiments, the UE 110A, 110B is further configured, e.g. by means of a managing module 660, to manage the transfer of the message over the radio interface according to the barring parameter. In an implementation form, the managing of the transfer of the message is performed in the radio layer of the UE 110A, 110B.

In some embodiments, the processing module 601 may comprise one or more of the first receiving module 610, the second receiving module 620, the obtaining module 630, the first determining module 640, the second determining module 650 and the managing module 660, the user application 670 as exemplifying hardware modules. In other examples, one or more of the aforementioned exemplifying hardware modules may be implemented as one or more software modules.

Figure 6:
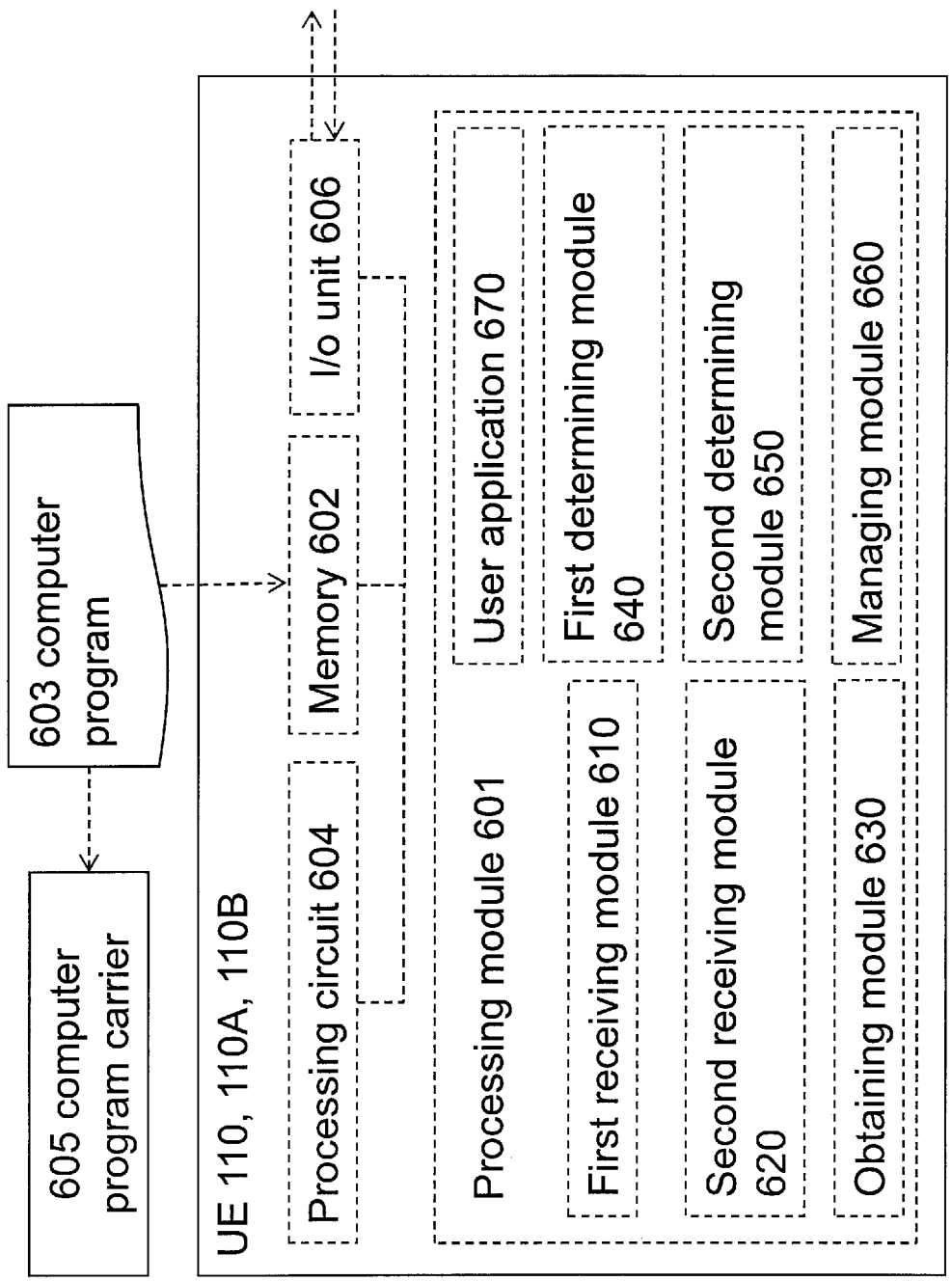
FIG. 6 is a block diagram illustrating embodiments of the user equipment.

FIG. 6 further illustrates a computer program carrier 605, or program carrier, which may comprise the computer program 603 as described directly above.

Moreover, UE 110A, 110B may further comprise an Input/Output unit 606, which may be exemplified by the receiving module and/or the sending module as described herein when applicable.

Example of embodiments of a method performed by an application managing function 130 for facilitating management, by the UE 110A, 1108, of the message transferable over the radio interface of the UE 110A, 110B, will now be described with reference to FIG. 7.

One or more of the following actions may be performed in any suitable order.

Action 710

To facilitate the management, by the UE 110A, 1108, of the message, the application managing function 130 may need to provide the configuration to the UE 110A, 110B.

The application managing function 130 may obtain a set of service identifiers. The set of service identifiers may be from e.g. an operator, who provides the application, such as a V2X application or layer. The set of the service identifiers identifies at least one service. According to some embodiments, the service may be provided by the V2X application, which may include the application managing function 130.

Action 720

The application managing function 130 may send, to the UE 110A, 110B, a configuration comprising the set of service identifiers mapped to a set of barring categories. Action 720 is the sending action corresponding to the receiving at Action 310, i.e. the configuration sent by the application managing function 130 is the same as the one received by the UE 110A, 110B. This action is similar to action 320.

According to some embodiments, the application managing function 130 comprises an application control layer. The Action 720 may be performed at the application control layer.

Figure 7:
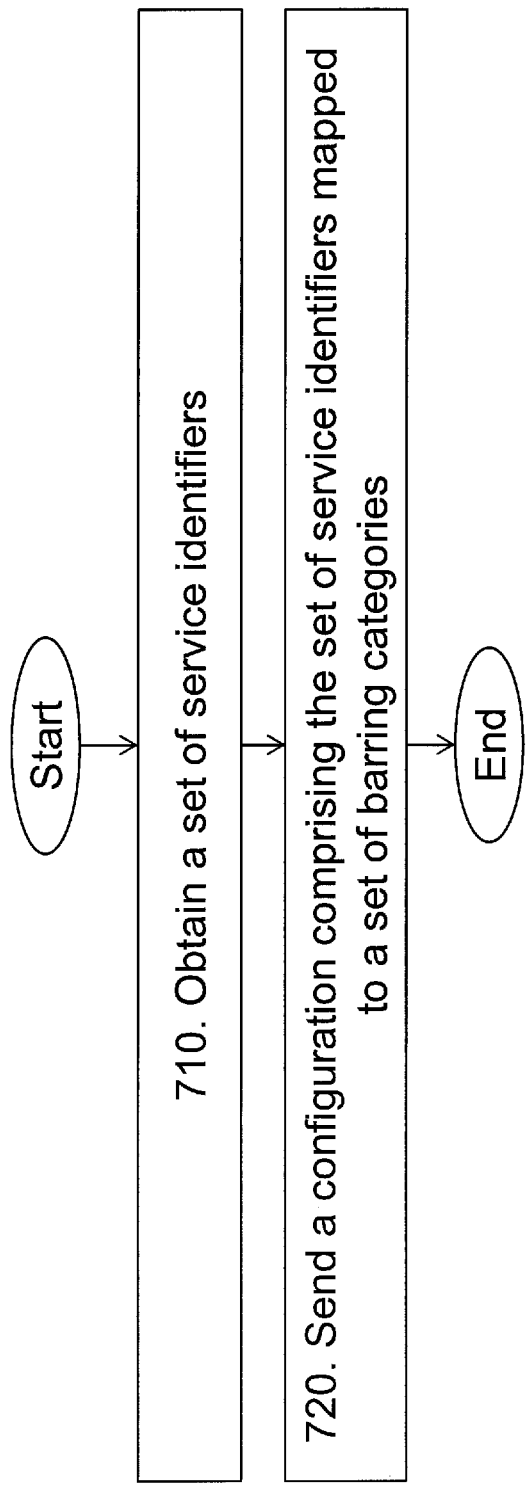
FIG. 7 is a flowchart illustrating embodiments of the method in the application managing function.

To perform the method embodiments corresponding to FIG. 7, the application managing function 130 shown in FIGS. 2-3 is discussed herein. The application managing function 130 may comprise the following arrangement depicted in FIG. 8 for facilitating management by the UE 110A, 110B of the message transferable over the radio interface of the UE 110A, 1108.

In some embodiments, the application managing function 130 may comprise a processing module, or a processor 801, such as a means for performing the methods described herein. The means may be embodied in the form of one or more hardware modules and/or one or more software modules.

The application managing function 130 may further comprise a memory 802. The memory may comprise, such as contain or store, instructions, e.g. in the form of a computer program 803, which may comprise computer readable code units.

According to some embodiments herein, the application managing function 130 and/or the processing module 801 may comprise a processing circuit 804 as an exemplifying hardware module, which may comprise one or more processors. Accordingly, the processing module 801 may be embodied in the form of, or 'realized by', the processing circuit 804. The instructions may be executable by the processing circuit 804, whereby the application managing function 130 is operative to perform the methods of FIG. 7. As another example, the instructions, when executed by the application managing function 130 and/or the processing circuit 804, may cause the application managing function 130 to perform the method according to FIG. 7.

According to some embodiments, the application managing function 130 is configured, e.g. by means of an obtaining module 810, to obtain a set of the service identifiers.

According to some embodiments, the application managing function 130 is further configured, e.g. by means of a sending module 820, to send, to the UE 110A, 110B, the configuration comprising the set of service identifiers mapped to a set of barring categories.

In some embodiments, the processing module 801 may comprise one or more of the obtaining module 810 and the sending module 820 as exemplifying hardware modules. In other examples, one or more of the aforementioned exemplifying hardware modules may be implemented as one or more software modules.

Figure 8:
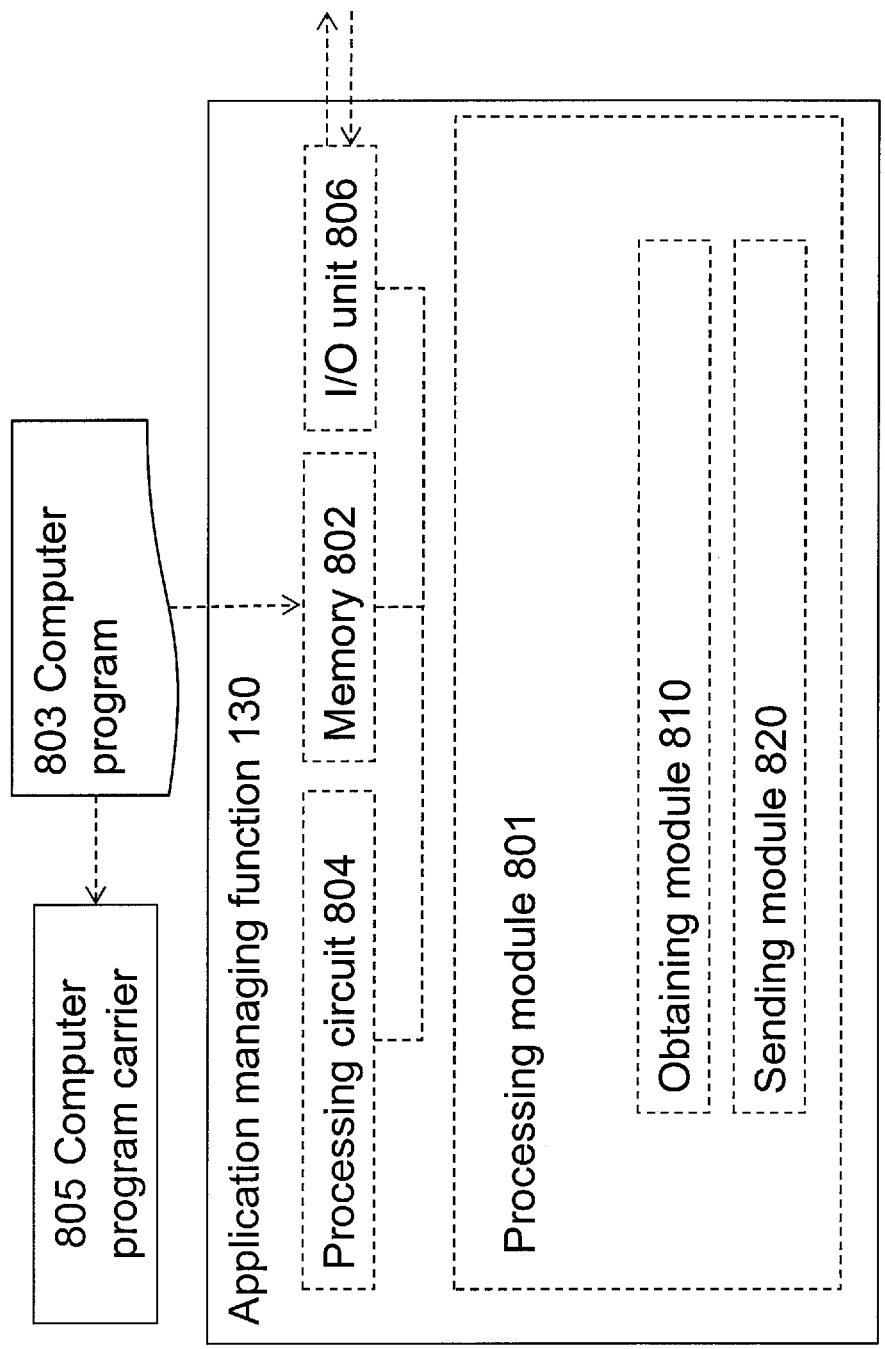
FIG. 8 is a block diagram illustrating embodiments of the application managing function.

FIG. 8 further illustrates a computer program carrier 805, or program carrier, which may comprise the computer program 803 as described directly above.

Moreover, application managing function 130 may further comprise an Input/Output unit 806, which may be exemplified by the receiving module and/or the sending module as described herein when applicable.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal.

Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

What is claimed is:

1. A method, performed by a user equipment (UE), for managing a message transferable over a radio interface of the UE, the method comprising:
   receiving, from an application managing function, a configuration comprising a set of service identifiers mapped to a set of barring categories, wherein the set of service identifiers identifies at least one service;
   receiving, from a radio access node, a set of barring parameters mapped to the set of barring categories, wherein each barring parameter indicates whether or not the radio interface is barred with respect to a respective barring category;
   obtaining a service identifier associated with the message;
   determining, based on the configuration, a barring category that is mapped to the service identifier;
   determining a barring parameter that is mapped to the barring category; and
   managing a transfer of the message over the radio interface according to the barring parameter.

2. The method of claim 1, wherein the radio interface comprises at least one of:
   a Uu interface between the UE and the radio access node, and
   a PC5 interface between the UE and a further UE.

3. The method of claim 1, wherein the transfer of the message relates to at least one of:
   sending, by the UE, of the message,
   receiving, by the UE, of the message, and
   establishing a Packet Data Network, PDN, connection for the message.

4. The method of claim 1, wherein said each barring parameter comprises a barring value indicating whether or not the radio interface is barred for the respective barring category.

5. The method of claim 1, wherein said each barring parameter comprises at least one of: a barring factor and a barring duration.

6. The method of claim 1, wherein said at least one service is related to at least one of:

Vehicle-to-everything; Public Safety communication; Public Safety discovery; wearable communication; multimedia telephony; IP Multimedia Subsystem; and Mobile Broadband.

7. The method of claim 1, wherein the UE comprises a user application layer and a radio layer.

8. A method, performed by an application managing function, for facilitating management, by a user equipment (UE) of a message transferable over a radio interface of the UE, the method comprising:

obtaining a set of one or more service identifiers, wherein each service identifier included in the set of the service identifiers identifies at least one service; and sending configuration information comprising the set of service identifiers and a set of barring category identifiers, wherein each one of the barring category identifiers identifies a barring category, and the configuration information links each service identifier included in the set of service identifiers to a single one of the barring category identifiers.

9. The method of claim 8, wherein
the set of barring category identifiers includes a first barring category identifier and a second barring category identifier,
the first barring category identifier is mapped to a first barring factor for a first interface, and
the second barring category identifier is mapped to a second barring factor for the first interface.

10. The method of claim 9, wherein
the first barring category identifier is mapped to a third barring factor for a second interface, and
the second barring category identifier is mapped to a fourth barring factor for the second interface.

11. The method of claim 10, wherein
the first interface is a Uu interface, and
the second interface is a PC5 interface.

12. The method of claim 8, wherein
the set of barring category identifiers comprises a first barring category identifier,
the method further comprises, after sending the configuration information, broadcasting barring parameter information, and
the barring parameter information a) comprises the first barring category identifier and a first barring factor and b) links the first barring factor to the barring category identifier.

13. The method of claim 12, wherein
the set of barring category identifiers further comprises a second barring category identifier, and
the barring parameter information: a) further comprises the second barring category identifier and a second barring factor and b) links the first barring factor to the barring category identifier.

14. A user equipment (UE) for managing a message transferable over a radio interface of the UE, the UE comprising a processor configured to:

receive, from an application managing function, a configuration comprising a set of service identifiers mapped to a set of barring categories, wherein the set of service identifiers is configured to identify at least one service;

receive, from a radio access node, a set of barring parameters mapped to the set of barring categories, wherein each barring parameter is configured to indicate whether or not the radio interface is barred with respect to a respective barring category;

obtain a service identifier associated with the message;

determine, based on the configuration, a barring category that is mapped to the service identifier;

determine a barring parameter that is mapped to the barring category; and manage a transfer of the message over the radio interface according to the barring parameter.

15. The UE of claim 14, wherein the radio interface is configured to comprise at least one of:
a Uu interface between the UE and the radio access node, and
a PC5 interface between the UE and a further UE.

16. The UE of claim 14, wherein the transfer of the message is configured to relate to at least one of:
sending, by the UE, of the message,
receiving, by the UE, of the message, and
establishing a Packet Data Network, PDN, connection for the message.

17. The UE of claim 15, wherein said each barring parameter is configured to comprise a barring value indicating whether or not the radio interface is barred for the respective barring category.

18. The UE of claim 14, wherein said each barring parameter is configured to comprise at least one of: a barring factor and a barring duration.

19. The UE of claim 14, wherein said at least one service is configured to relate to at least one of:
Vehicle-to-everything; Public Safety communication; Public Safety discovery; wearable communication; multimedia telephony; IP Multimedia Subsystem; and Mobile Broadband.

20. The UE of claim 14, wherein the UE is configured to comprise an application layer and a radio layer.

* * * * *